(12) United States Patent
Johs et al.

(10) Patent No.: US 7,025,501 B2
(45) Date of Patent: Apr. 11, 2006

(54) TRACKING TEMPERATURE CHANGE IN BIREFRINGENT MATERIALS

(75) Inventors: Blaine D. Johs, Lincoln, NE (US); Miroslav Micovic, Thousand Oaks, CA (US)

(73) Assignee: J. A. Woollam Co., INC, Lincoln, NE (US)

( * ) Notice: Subject to any disclaimer, the term of this patent is extended or adjusted under 35 U.S.C. 154(b) by 106 days.

(21) Appl. No.: 10/870,828

(22) Filed: Jun. 17, 2004

(65) Prior Publication Data

US 2004/0258128 A1 Dec. 23, 2004

Related U.S. Application Data

(60) Provisional application No. 60/479,047, filed on Jun. 18, 2003.

(51) Int. Cl.
  *G01K 11/32* (2006.01)
  *G01J 5/08* (2006.01)
  *G01J 4/04* (2006.01)

(52) U.S. Cl. .............. 374/130; 374/161; 374/120; 356/365; 356/369

(58) Field of Classification Search .............. None
See application file for complete search history.

(56) References Cited

U.S. PATENT DOCUMENTS

| | | | |
|---|---|---|---|
| 4,198,261 A * | 4/1980 | Busta et al. .............. 216/60 |
| 4,277,320 A | 7/1981 | Beguwala et al. .......... 204/164 |
| 4,770,924 A | 9/1988 | Takai et al. .............. 428/212 |
| 4,776,925 A | 10/1988 | Fossum et al. .............. 156/653 |
| 5,118,200 A * | 6/1992 | Kirillov et al. .............. 374/120 |
| 5,282,925 A | 2/1994 | Jeng et al. .............. 156/646 |
| 5,329,357 A * | 7/1994 | Bernoux et al. .............. 356/369 |
| 5,688,585 A | 11/1997 | Lingle et al. .............. 428/216 |
| 5,837,108 A | 11/1998 | Lingle et al. .............. 204/192.15 |
| 5,929,995 A * | 7/1999 | Johs .............. 356/369 |
| 6,008,906 A | 12/1999 | Maris .............. 356/432 |
| 6,049,419 A * | 4/2000 | Wheatley et al. .............. 359/359 |
| 6,090,442 A | 7/2000 | Klaus et al. .............. 427/255.15 |
| 6,211,961 B1 | 4/2001 | Maris .............. 356/432 |
| 6,277,657 B1 | 8/2001 | Nozawa et al. .............. 438/8 |
| 6,300,638 B1 | 10/2001 | Groger et al. .............. 250/458.1 |
| 6,317,216 B1 | 11/2001 | Maris .............. 356/496 |
| 6,436,541 B1 | 8/2002 | Sopko et al. .............. 428/432 |
| 6,459,126 B1 | 10/2002 | Mogami et al. .............. 257/350 |
| 6,473,179 B1 * | 10/2002 | Wang et al. .............. 356/364 |
| 6,509,200 B1 | 1/2003 | Koyanagi .............. 438/14 |
| 6,563,591 B1 | 5/2003 | Maris .............. 356/496 |
| 6,567,213 B1 * | 5/2003 | Rosencwaig et al. ....... 359/369 |
| 6,583,875 B1 | 6/2003 | Wei et al. .............. 356/369 |
| 6,596,404 B1 | 7/2003 | Albaugh et al. .............. 428/447 |
| 6,882,424 B1 * | 4/2005 | Opsal et al. .............. 356/432 |
| 6,911,349 B1 * | 6/2005 | Li et al. .............. 438/16 |
| 2003/0164946 A1 * | 9/2003 | Borden et al. .............. 356/432 |
| 2003/0197864 A1 * | 10/2003 | Wei et al. .............. 356/369 |
| 2004/0125451 A1 * | 7/2004 | Miyatake .............. 359/494 |
| 2005/0046842 A1 * | 3/2005 | Uhrich et al. .............. 356/369 |

OTHER PUBLICATIONS

PCT WO 01/90687 A2 WEI/Thermawave.

(Continued)

*Primary Examiner*—Gail Verbitsky
(74) *Attorney, Agent, or Firm*—James D. Welch

(57) ABSTRACT

A method for tracking change in Temperature of Uniaxial or Biaxial Anisotropic Samples utilizing polarized electromagnetic radiation.

9 Claims, 6 Drawing Sheets

OTHER PUBLICATIONS

Substrate Temperature Reference Using SiC Absorption Edge Measured by In Situ Spectral Reflectometry, Balmer et al.,J. of Crystal Growth, 248, (2003).

"Investigation of Half-Wave Method for Birefringence or Thickness Measurements of a Thick, Semitransparent, Uniaxial, Anisotropic Substrate by Use of Spectroscopic Ellipsometry", Kildemo et al., Appl. Optics., vol. 30, No. 25, (2000).

"Advanced Process Control for High Quality R & D and Production of MOVPE Material by RealTemp", Malm et al., J. of Crystal Growth, 248, (2003).

* cited by examiner

TRACKING TEMPERATURE CHANGE IN BIREFRINGENT MATERIALS

This Application Claims Benefit of Provisional Application Ser. No. 60/479,047 Filed Jun. 18, 2003.

TECHNICAL FIELD

This invention relates to monitoring of temperature of samples, and more particularly to tracking change in Temperature of Uniaxial or Biaxial Anisotropic Samples utilizing Polarized Electromagnetic Radiation.

BACKGROUND

It is well known to apply Ellipsometry to characterize Physical and Optical properties of Samples. It is also known that while Temperature changes affect Samples, detection of said changes thereof using electromagnetic radiation is often difficult. For instance, plots of Optical Constants vs. wavelength often change very little with temperature.

A known Patent which describes monitoring Temperature of a sample using a Rotating Compensator Ellipsometer is U.S. Pat. No. 6,596,404 to Wei et al.

Other Patents found in a Search for key-words (Ellipsometry and Temperture) are:
U.S. Pat. No. 6,583,875;
U.S. Pat. No. 6,563,591;
U.S. Pat. No. 6,596,404;
U.S. Pat. No. 6,509,200;
U.S. Pat. No. 6,459,126;
U.S. Pat. No. 6,436,541;
U.S. Pat. No. 6,317,216;
U.S. Pat. No. 6,300,638;
U.S. Pat. No. 6,277,657;
U.S. Pat. No. 6,211,961;
U.S. Pat. No. 6,090,442;
U.S. Pat. No. 6,008,906;
U.S. Pat. No. 6,837,108;
U.S. Pat. No. 6,688,585;
U.S. Pat. No. 6,282,925;
U.S. Pat. NO. 6,770,924; and
U.S. Pat. No. 6,277,320.

A paper of relevance is that by Balmer et al., titled "Substrate Temperature Reference Using SiC Absorption Edge Measured by In Situ Spectral Reflectometry, J. of Crystal Growth, 248, (2003). This paper describes application of Reflectometry to determine substrate temperature.

Another paper, Titled "Investigation of Half-Wave Method for Birefringence or Thickness Measurements of a Thick, Semitransparent, Uniaxial, Anisotropic Substrate by Use of Spectroscopic Ellipsometry", Kildemo et al., Appl. Optics., Vol. 30, No 25, (2000), describes application of Ellipsometry to investigate Birefringence in substrates.

Another paper titled "Advanced Process Control for High Quality R & D and Production of MOVPE Material by RealTem", Malm et al., J. of Crystal Growth, 248, (2003) describes determination of temperature of a wafer by measuring the emmissivity of a wafer using an infra-red pyrometer with a pulsed laser-based reflectometer, both working at 905 nm and positioned at normal incidence to wafers inside a Metalorganic Vapor Phase Epitaxy (MOVPE) system.

The method disclosed herein for monitoring Temperature Change in Uniaxial or Biaxial Anisotropic Samples which utilizes change in birefringence electromagnetic radiation provides benefit over the prior art.

DISCLOSURE OF THE INVENTION

The disclosed invention provides a method to detect change in Sample Temperature utilizing electromagnetic radiation, where the Sample demonstrates uniaxial or biaxial anisotropy, (ie. it has unequal ordinary and extraordinary indices of refraction). Two distinctive cases arise, the first being where both the Ordinary (no) and Extraordinary (ne) Indicies of Refraction are in a common plane substantially parallel to a surface of a sample, and the other where ordinary index of refraction is in said plane, and the extraordinary is substantially perpendicular to said sample surface. It should be appreciated that when a beam of electromagnetic radiation is oriented to interact with a uniaxial or biaxial sample so that it experiences birefringence, in either reflection of transmission, it becomes possible to monitor oscillation patterns in detectable results caused by said interaction.

A disclosed invention method of detecting and tracking temperature change of a sample then comprises the steps of:

a) providing a sample which presents with an optical axis oriented normal to a surface thereof and which demonstrates uniaxial anisotropy in that the ordinary (no) and extraordinary (ne) indicies of refraction are not equal, said ordinary (no) index of refraction being substantially parallel to said surface and said extraordinary (ne) index of refraction being substantially perpendicular to said surface, said sample further having a depth (d) directed perpendicular to said surface;

b) while said sample is at a first temperature applying a polarized spectroscopic electromagnetic beam to said surface at an oblique angle to said surface such that it reflects therefrom and experiences birefringence;

c) monitoring the reflected electromagnetic radiation and therefrom effectively determining a first plot of (no−ne)(d) vs wavelength;

d) changing the temperature of said sample and similarly effectively determining a second plot of (no−ne)(d) vs wavelength; and e) detecting change in the first and second plots, and interpreting said change in terms of temperature change, which the temperature change can be determined absolute terms.

The angle of incidence of the incident beam of the polarized spectroscopic electromagnetic radiation is preferable at between 10 and 85 degrees to said sample surface.

Another disclosed invention method of detecting and tracking temperature change of a sample comprises the steps of:

a) providing a sample which presents with an optical axis oriented parallel to a surface thereof and which demonstrates uniaxial anisotropy in that the ordinary (no) and extraordinary (ne) indicies of refraction are not equal, said ordinary (no) and extraordinary (ne) indicies of refraction being at ninety degrees to one another in a plane substantially parallel to said surface, said sample having a depth (d) directed substantially perpendicular to said surface;

b) while said sample is at a first temperature applying an incident beam of polarized spectroscopic electromagnetic radiation to said surface other than along a direction coincident with that of either the ordinary (no) or the extraordinary (ne) index of refraction such that it experiences birefringence;

c) monitoring the output spectroscopic electromagnetic radiation therefrom and effectively determining a first plot of (no−ne)(d) vs wavelength;

d) changing the temperature of said sample and similarly effectively determining a second plot of (no−ne)(d) vs wavelength; and e) detecting change in the first and second plots, and interpreting said change in terms of temperature change, which temperature change can be determined in absolute terms.

The polarization azimuth of the incident beam of spectroscopic electromagnetic radiation is preferably set at 45 degrees to both the ordinary (no) and extraordinary (ne) indicies of refraction, but any angle which provides an orientation such that the beam experiences birefringence is functional. The angle of incidence can be set anywhere between 10 and 85 degrees.

While the beam of polarized spectroscopic electromagnetic radiation is typically caused to approach a sample along an oblique angle to the surface thereof and reflection results are detected, it is within the scope of the invention to orient said beam of spectroscopic electromagnetic radiation to approach along a normal to the surface of the sample and transmission results detected.

Another disclosed invention method of detecting and tracking temperature change of a sample comprises the steps of:

a) providing a sample which demonstrates biaxial anisotropy in that the ordinary (no) and extraordinary (ne) indicies of refraction are not equal, said sample further having a depth (d) directed perpendicular to said surface;

b) while said sample is at a first temperature applying a polarized spectroscopic electromagnetic beam to said surface along a locus such that it experiences birefringence, and reflects from said sample;

c) monitoring the reflected electromagnetic radiation and therefrom effectively determining a first plot of (no−ne)(d) vs wavelength;

d) changing the temperature of said sample and similarly effectively determining a second plot of (no−ne)(d) vs wavelength; and e) detecting change in the first and second plots, and interpreting said change in terms of temperature change.

In practice a standard sample can be investigated along with determination of absolute temperature, to provide data which allows conversion from temperature change to absolute temperature values in investigated samples.

The disclosed invention will be better understood by reference to the Detailed Description Section of this Specification, in conjunction with the Drawings.

SUMMARY OF THE INVENTION

It is therefore a purpose and/or objective of the disclosed invention to teach a method of monitoring temperature change by applying a polarized spectroscopic electromagnetic beam to a sample surface along a locus such that it experiences birefringence, and noting changes therein as a function of temperature.

Other purposes and/or objectives will become apparent upon a reading of the Specification and Claims.

DETAILED DESCRIPTION

Figure 1:
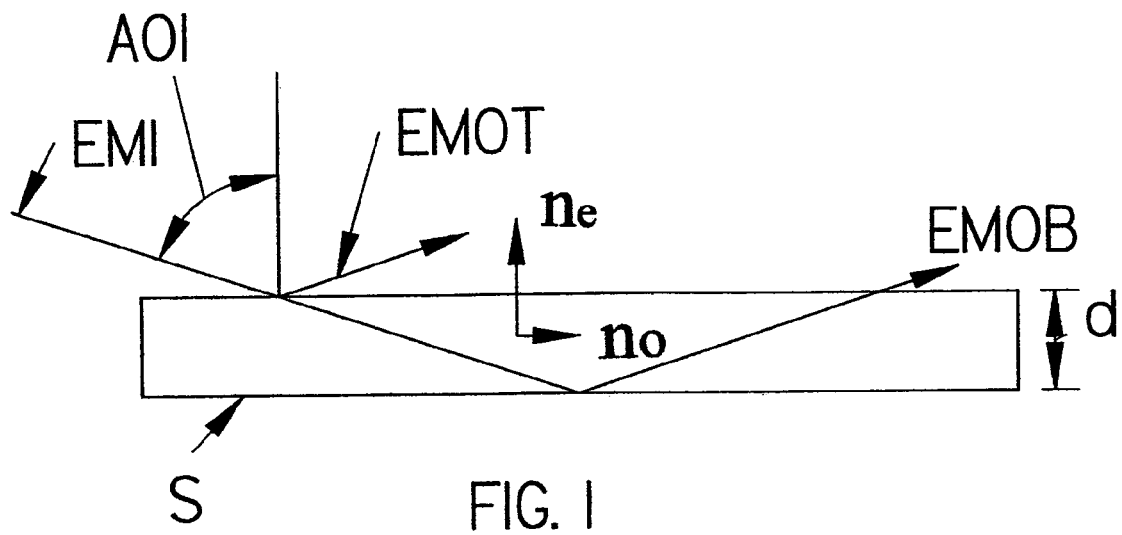
FIG. 1 demonstrates the case where the Ordinary (no) Refractive Index is substantially parallel to the surface of a sample (S) and the Extraordinary (ne) Refractive Index is substantially perpendicular thereto.
Figure 2:
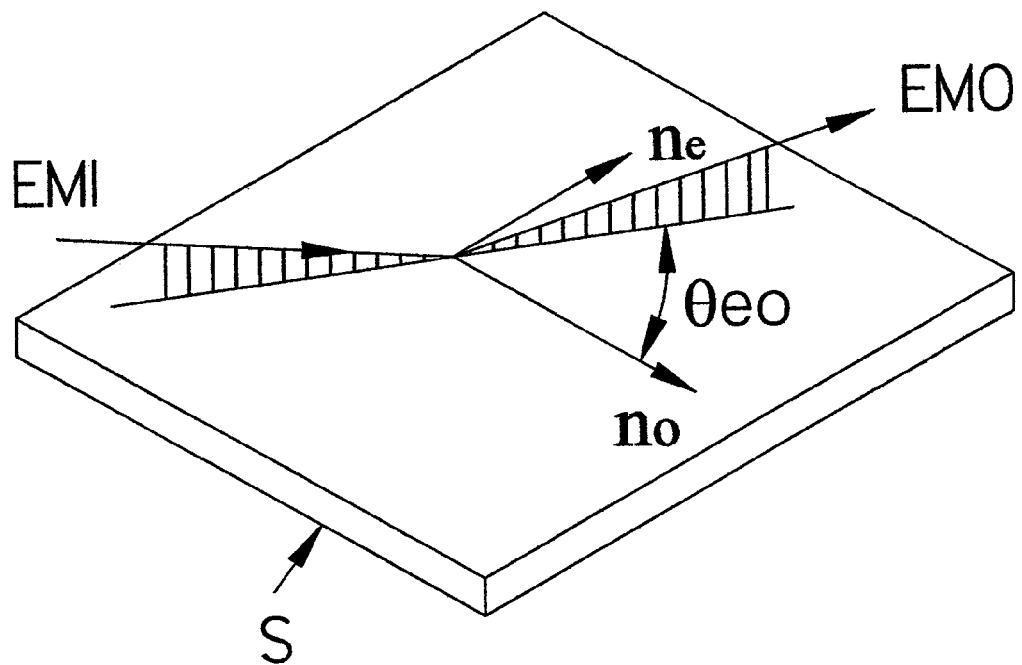
FIG. 2 demonstrates a sample where the Ordinary (no) and Extraordinary (ne) are in a plane substantially parallel to the surface of a Sample (S).

FIG. 1 demonstrates the case where the Ordinary (no) Refractive Index is substantially parallel to the surface of a sample (S) and the Extraordinary (ne) Refractive Index is substantially perpendicular thereto. Also shown is an electromagnetic beam (EMI) which is incident on the Sample Surface at an Angle-of-Incidence (AOI). Note that electromagnetic beams (EMOT) and (EMOB) reflect from the Top and Bottom Surfaces of the Sample (S), which surfaces are separated by a thickness (d). Said Reflected Beams (EMOT) and (EMOB) are intercepted by a Detector (not shown). Other geometries which produce such generated output when a beam of electromagnetic radiation is incident thereupon are included in the disclosed invention. This includes the case as shown in FIG. 2 where a sample has both the Ordinary (no) and Extraordinary (ne) in a plane substantially parallel to the surface of a Sample (S) and where a polarized beam of electromagnetic radiation is incident thereupon other than along the direction of either (no) or (ne) such that the beam experiences birefringence. A preferred polarization azimuth ($\theta$eo) is 45 degrees so that components of the beam propagate along both axes of the Ordinary (no) and Extraordinary (ne) Refractive Indicies, however any orientation which causes the beam to experience birefringence is within the scope of the invention. Further, the Angle-of-Incidence can be anywhere between about 10 and 85 degrees.

As an example a Silicon Carbide (SiC) sample was investigated. A mathematical model was constructed comprising Two sets of Optical Constants, (Ordinary Index and Birefringence at a Nominal Angle thereto such that the Extraordinary Index can be determined), which Optical Constants are allowed to systematically vary with Sample Composition and Temperature, a surface roughness to account for surface oxide and per se. roughness, and Thickness. Backside effects are also present as the SiC is transparent and said backside reflections, along with Surface Reflections, are monitored in the present invention methodology.

Figure 3:
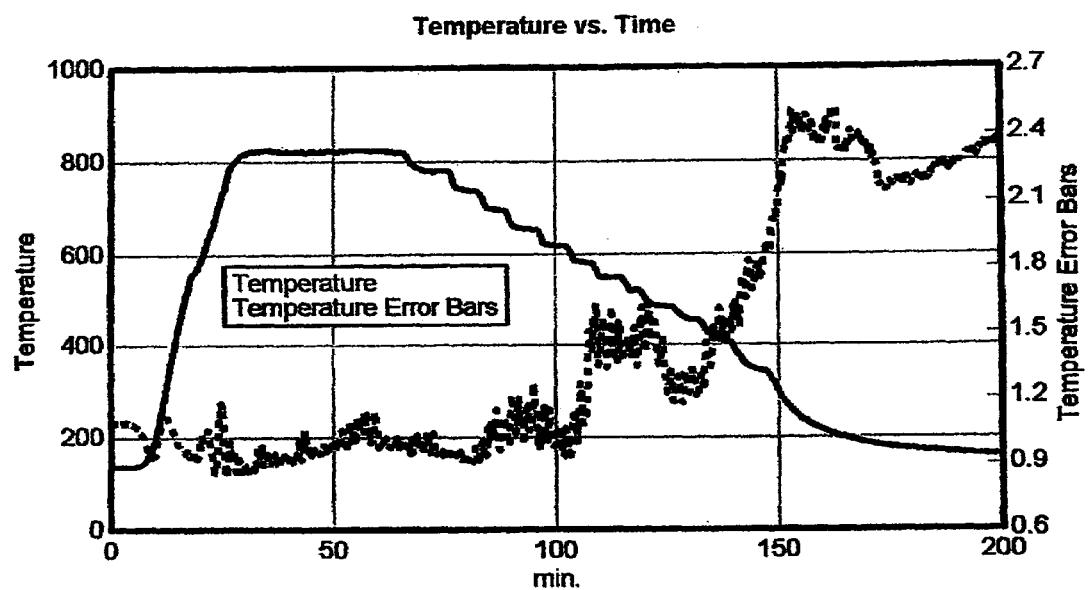
FIG. 3 shows a plot of Temperature and Temperature Error Bars vs. Time as determined by practice of the present invention methodology.
Figure 4:
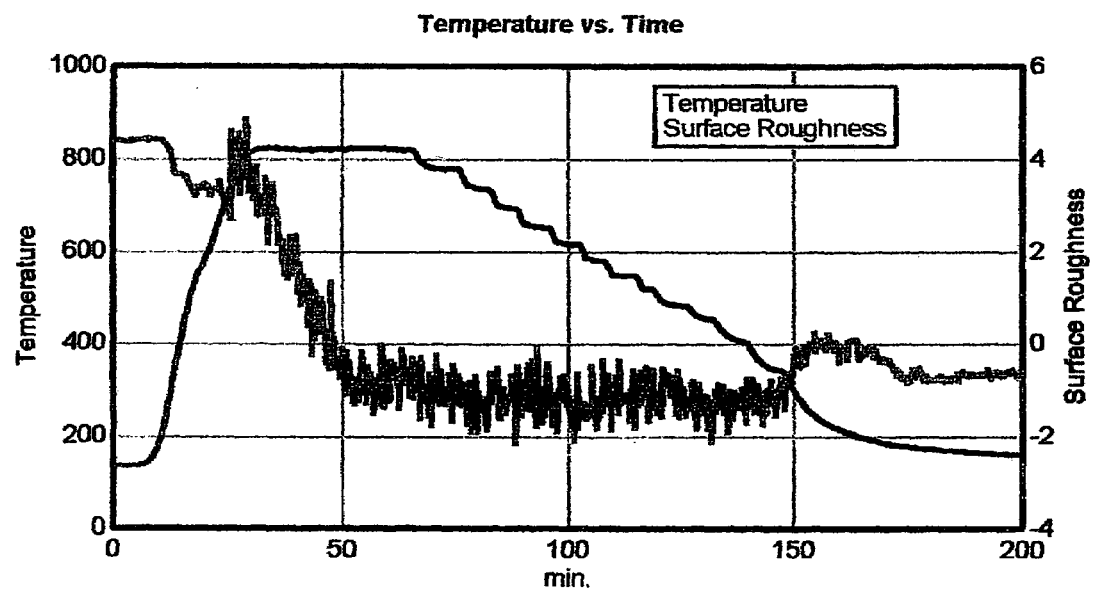
FIG. 4 shows Temperature and Surface Roughness vs. Time as determined by practice of the present invention methodology.

Application of the present invention methodology provides results shown in FIG. 3, which shows a plot of Temperature and Temperature Error Bars vs. Time, and in FIG. 4 which shows Temperature and Surface Roughness vs. Time as determined by practice of the present invention methodology. Note that the "steps" in Temperature in FIG. 3 are the result of intentional cooldown setpoints. Note also that both the precision and error bars are on the order of 1–2 degrees C. The FIG. 3 results are very free of artifacts and demonstrate a believable profile. FIG. 4 shows that the Surface Roughness (which includes oxide effects), exhibits some artifacts at the beginning and end of the plot, (probably the result of limitations in the Optical Constant Library utilized), and that a very clear and believable oxide desorption behavior is observed at high temperature.

Figure 5A:
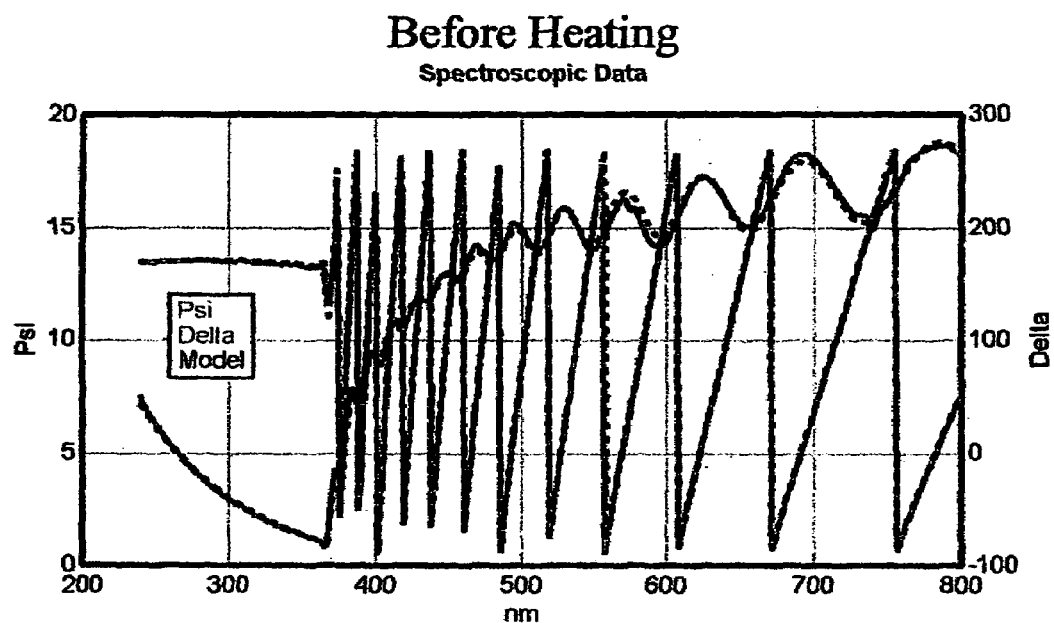
FIGS. 5a, 5b, 5c, 5d and 5e show PSI ($\psi$) and DELTA ($\Delta$) before and during heating, at high temperature, and during and after cooling respectively.
Figure 5B:
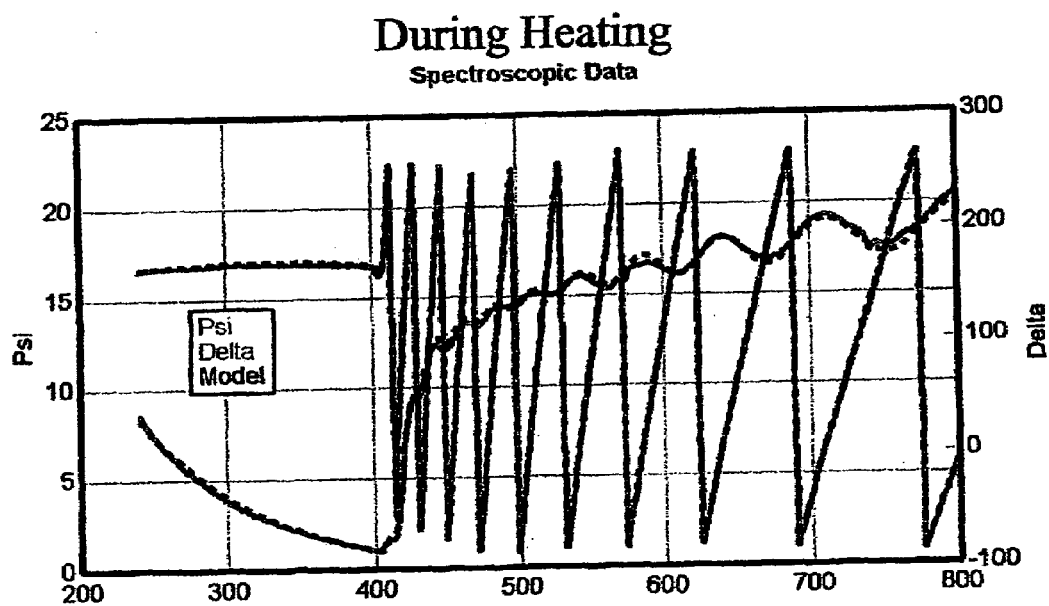
Figure 5C:
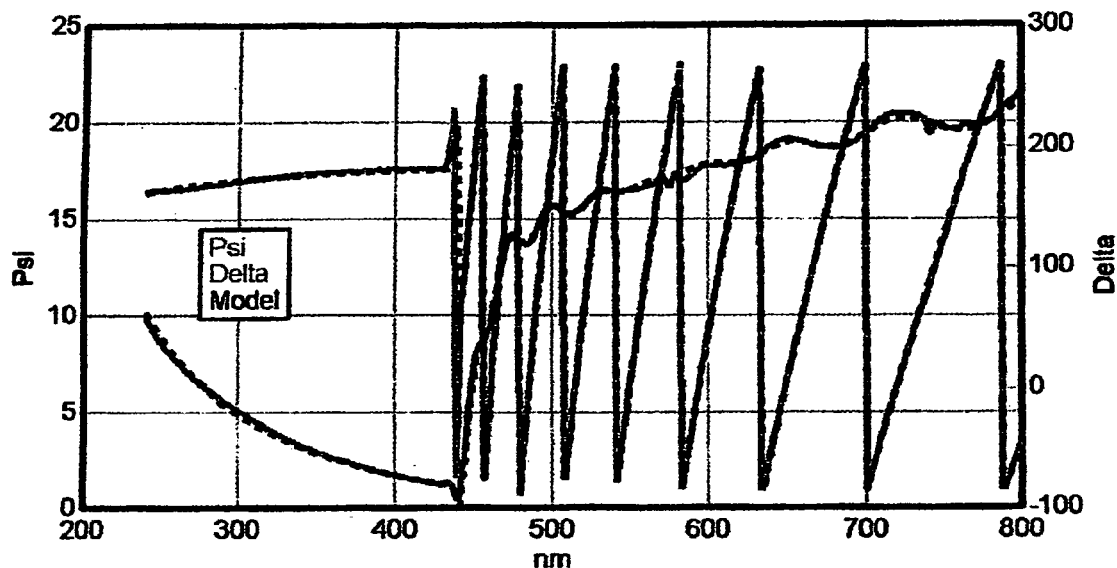
Figure 5D:
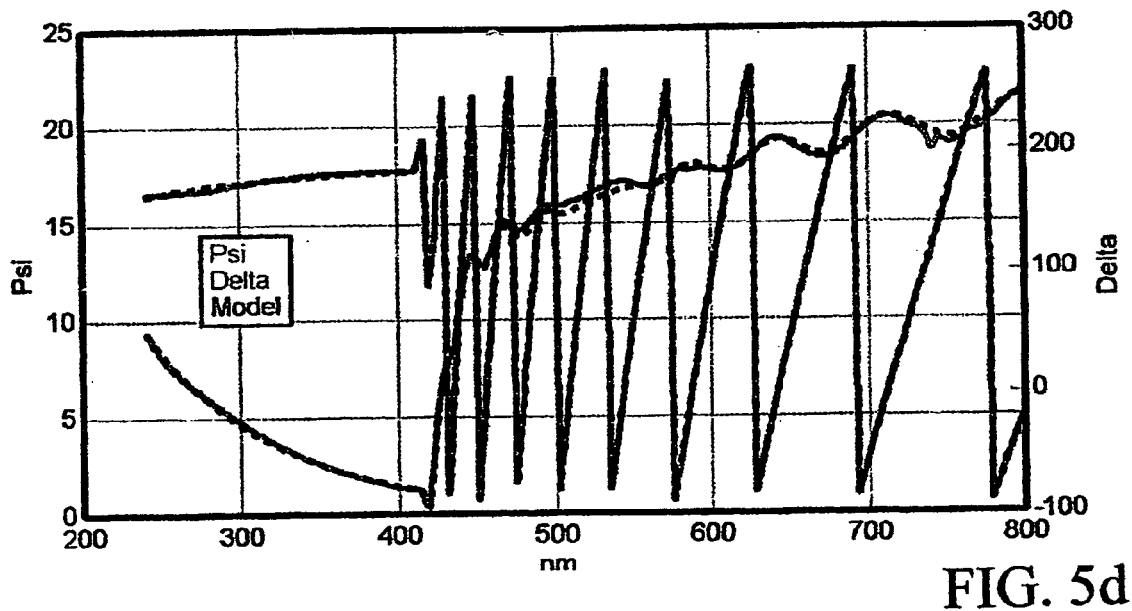
Figure 5E:
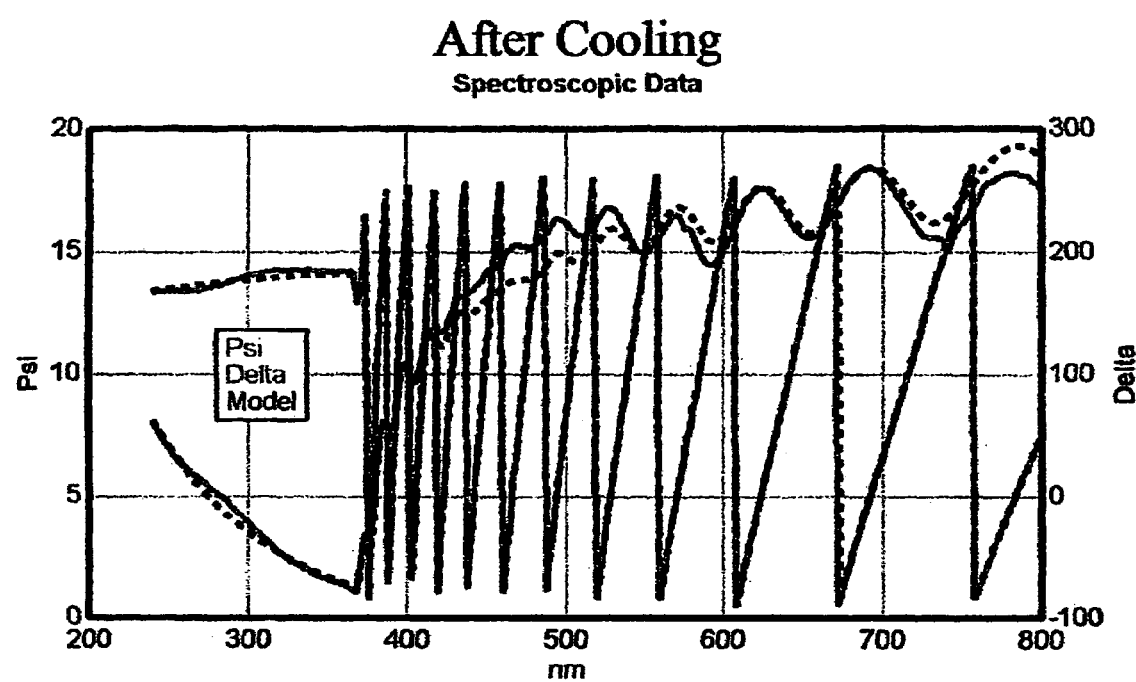
Figure 5F:
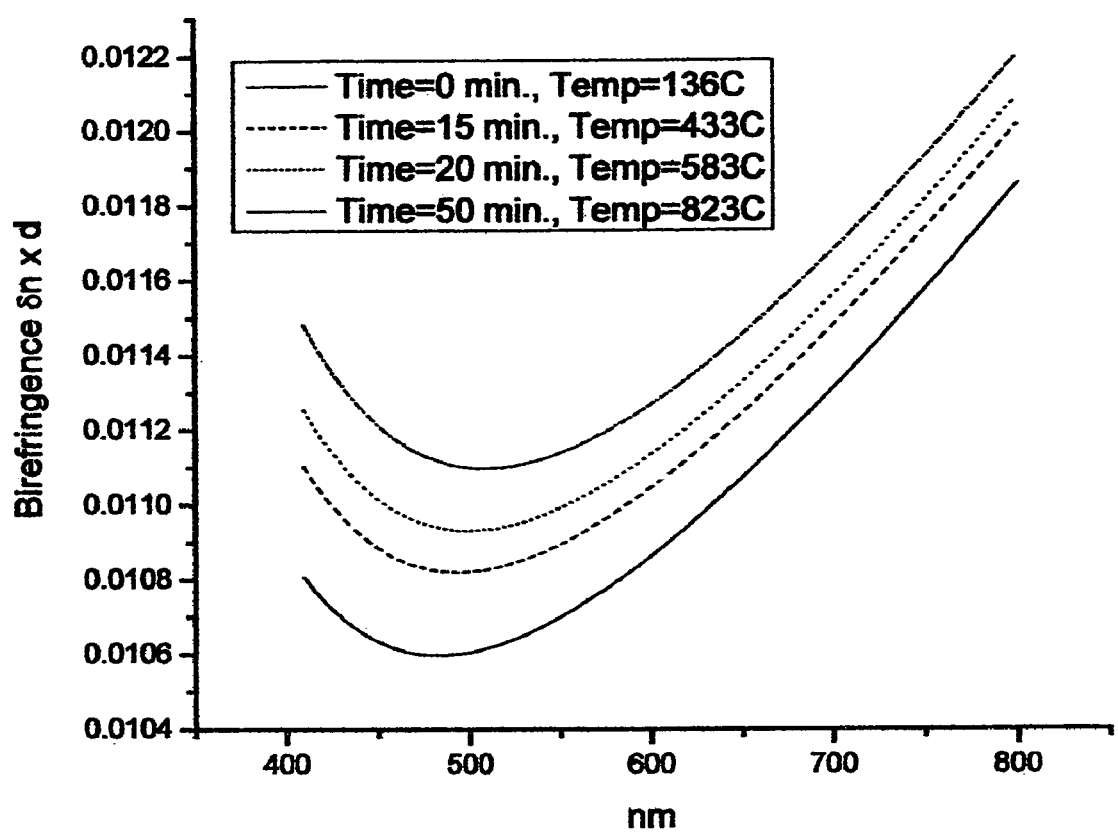
FIG. 5f demonstrates the variation of Birefringence (no−ne)d wtih Temperature, taking into account the oblique angle of incidence ($\phi$) of the electromagnetic beam (EMI) onto the sample surface.

Psi (Ψ) and Delta (Δ) plots are presented in FIGS. 5a, 5b, 5c, 5d and 5e which correspond to before and during heating, at high temperature, and during and after cooling respectively. The key features in the Spectra are the onset of Oscillations and Sharp Rise in PSI, (the result of the SiC Bandgap), and the Frequency and Phase of the Oscillations in DELTA, (the result of the Birefringence in the SiC Substrate). Note that the Fit between the data and the results obtained from the Mathematical Model are very good. The data demonstrates that SiC is anisotropic and requires two sets of Optical Constants to be parameterized, and that the Birefringence changes as a function of Temperature. FIG. 5f is included to demonstrate the actual variation of Birefringence (no−ne)d with Temperature, taking into account the oblique angle of incidence (φ) of the electromagnetic beam (EMI) onto the sample surface. The Birefringence is calculated from:

$$\text{Birefringence} = \delta n \frac{\sin\phi^2}{n^2\sqrt{1 - \frac{\sin\phi^2}{n^2}}} d$$

where (n) and the (δn) are given by:

$$\delta n = (n_o - n_e)$$

$$n = 0.5(n_o + n_e)$$

It should be appreciated that a key advantage is that large canges in period and phase of oscillations provide high sensitivity to temperature.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. A method detecting and tracking temperature change of a sample comprising the steps of:
   a) providing a sample which presents with an optical axis oriented normal to a surface thereof and which demonstrates uniaxial anisotropy in that the ordinary (no) and extraordinary (ne) indicies of refraction are not equal, said ordinary (no) index of refraction being substantially parallel to said surface and said extraordinary (ne) index of refraction being substantially perpendicular to said surface, said sample further having a depth (d) directed perpendicular to said surface;
   b) while said sample is at a first temperature applying a polarized spectroscopic electromagnetic beam to said surface at an oblique to said surface such that it reflects from said sample and such that it experiences birefringence;
   c) monitoring the reflected electromagnetic radiation and therefrom effectively determining a first plot of (no−ne,)(d) vs wavelength;
   d) changing the temperature of said sample and similarly effectively determining a second plot of (no−ne)(d) vs wavelength; and
   e) detecting change in the first and second plots, and interpreting said change in terms of temperature change.

2. A method as in claim 1 in which the angle of incidence of the incident beam of spectroscopic electromagnetic radiation is at between 10 and 85 degrees to said sample surface.

3. A method as in claim 1 in which the temperature change determined in step e is determined in absolute terms.

4. A method detecting and tracking temperature change of a sample comprising the steps of:
   a) providing a sample which presents with an optical axis oriented parallel to a surface thereof and which demonstrates uniaxial anisotropy in that the ordinary (no) and extraordinary (ne) indicies of refraction are not equal, said ordinary (no) and extraordinary (ne) indicies of refraction being at ninety degrees to one another in a plane substantially parallel to said surface, said sample having a depth (d) directed substantially perpendicular to said surface;
   b) while said sample is at a first temperature applying a polarized incident beam of spectroscopic electromagnetic radiation to said surface other than along a direction coincident with that of either the ordinary (no) or the extraordinary (ne) index of refraction such that it experiences birefringence;
   c) monitoring the output spectroscopic electromagnetic radiation therefrom and effectively determining a first plot of (no−ne)(d) vs wavelength;
   d) changing the temperature of said sample and similarly effectively determining a second plot of (no−ne)(d) vs wavelength; and
   e) detecting change in the first and second plots, and interpreting said change in terms of temperature change.

5. A method as in claim 4 in which the plane of incidence of the incident beam of spectroscopic electromagnetic radiation is at 45 degrees to both the ordinary (no) and extraordinary (ne) indicies of refraction and the angle of incidence is between 10 and 85 degrees.

6. A method as in claim 4 in which the temperature change determined in step e is determined in absolute terms.

7. A method as in claim 4 in which the beam approaches along a normal to the surface of the sample and transmission results are detected.

8. A method as in claim 4 in which the beam approaches along an oblique angle to the surface of the sample and reflection results are detected.

9. A method detecting and tracking temperature change of a sample comprising the steps of:
   a) providing a sample which demonstrates biaxial anisotropy in that the ordinary (no) and extraordinary (ne) indicies of refraction are not equal, said sample further having a depth (d) directed perpendicular to said surface;
   b) while said sample is at a first temperature applying a polarized spectroscopic electromagnetic beam to said surface along a locus such that it experiences birefringence, and reflects from said sample;
   c) monitoring the reflected electromagnetic radiation and therefrom effectively determining a first plot of (no−ne)(d) vs wavelength;
   d) changing the temperature of said sample and similarly effectively determining a second plot of (no−ne)(d) vs wavelength; and
   e) detecting change in the first and second plots, and interpreting said change in terms of temperature change.

* * * * *